June 26, 1956  T. W. PAUL  2,751,739
ADJUSTABLE BEET DIGGING AND LIFTING DEVICE
Filed May 29, 1952  5 Sheets-Sheet 4

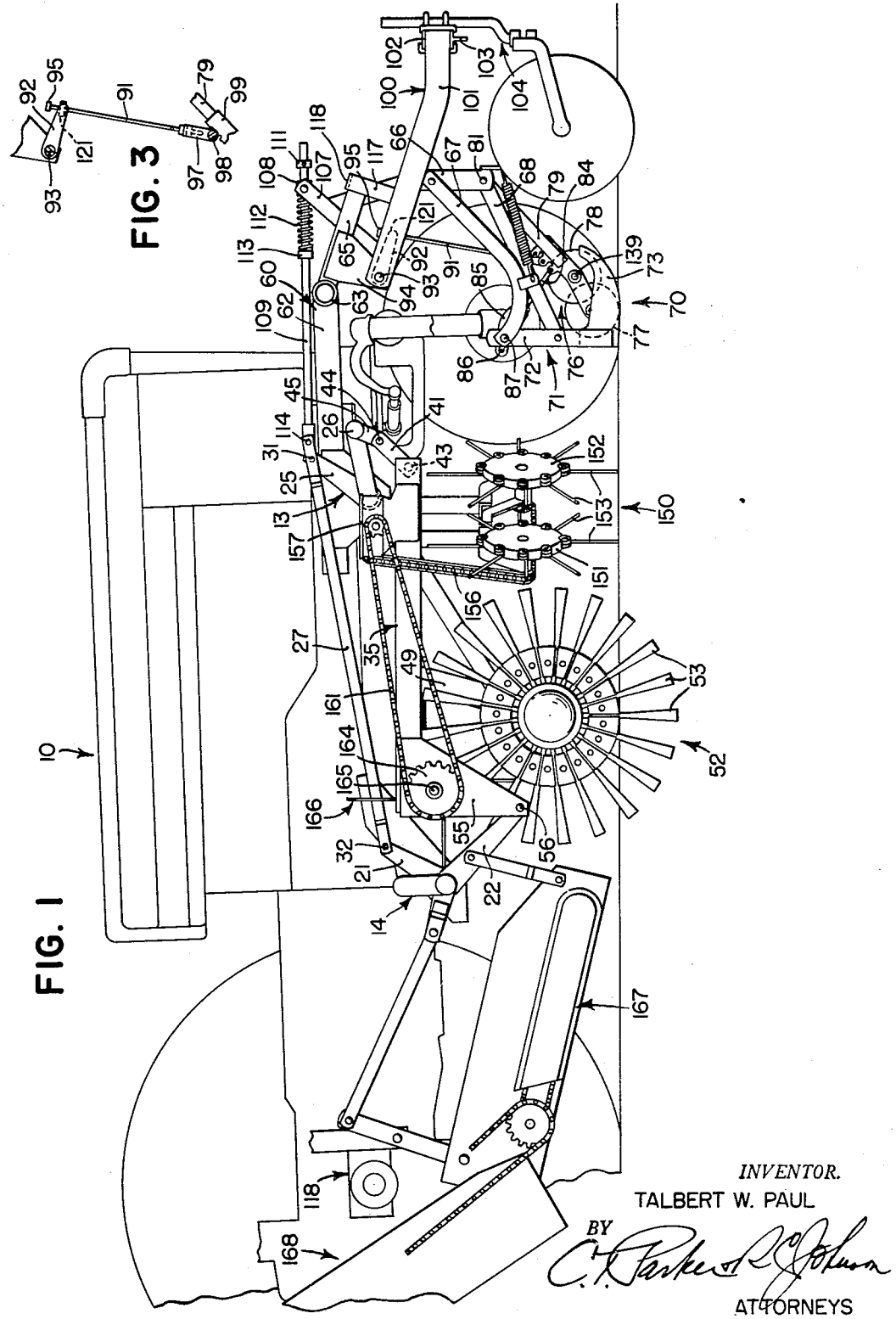

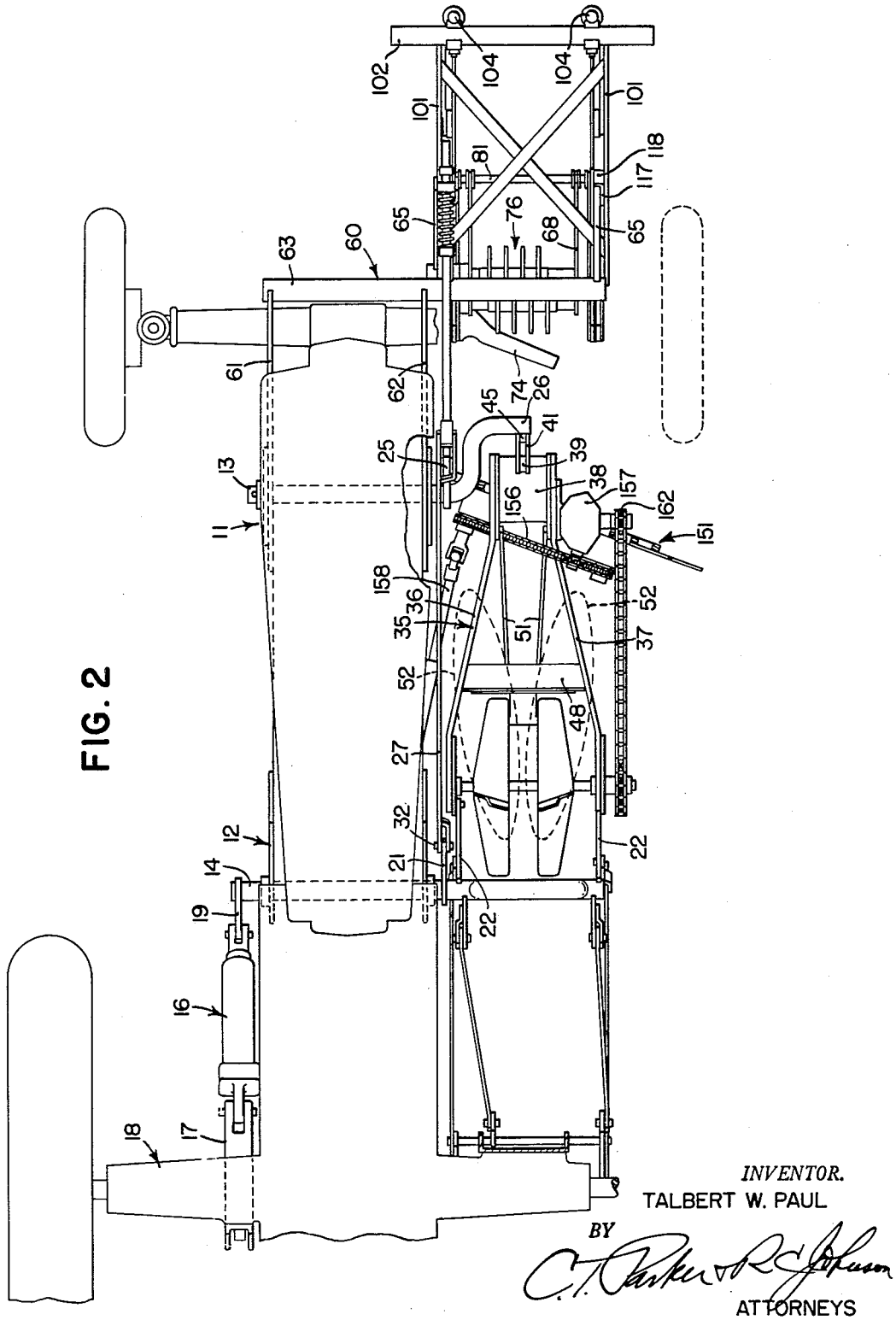

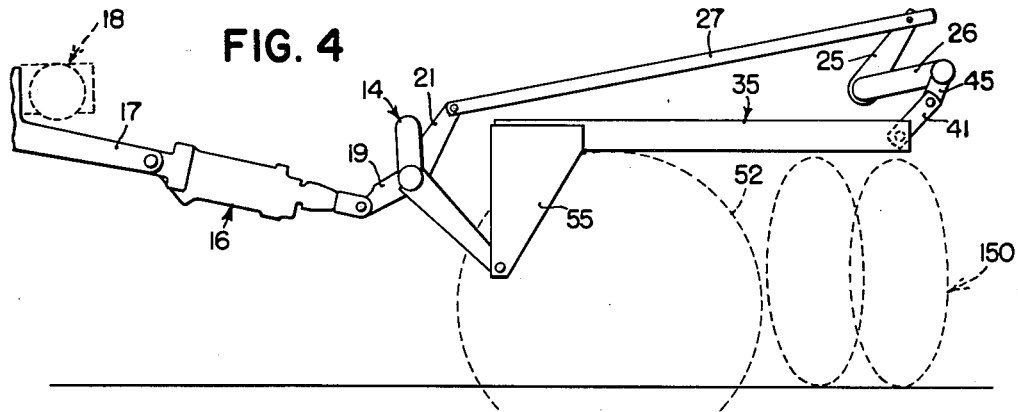
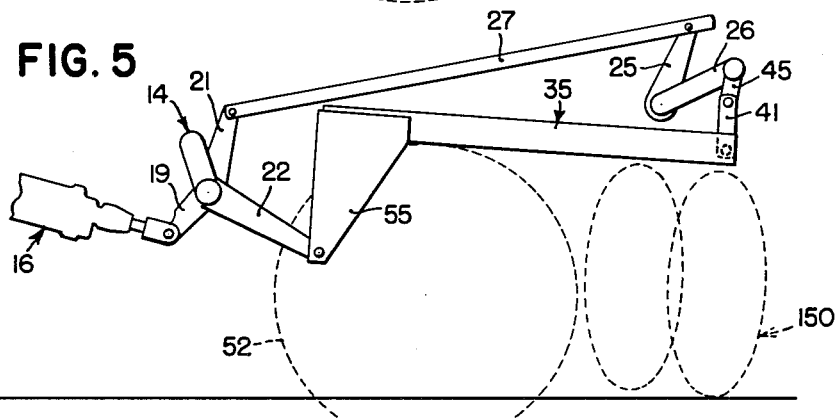
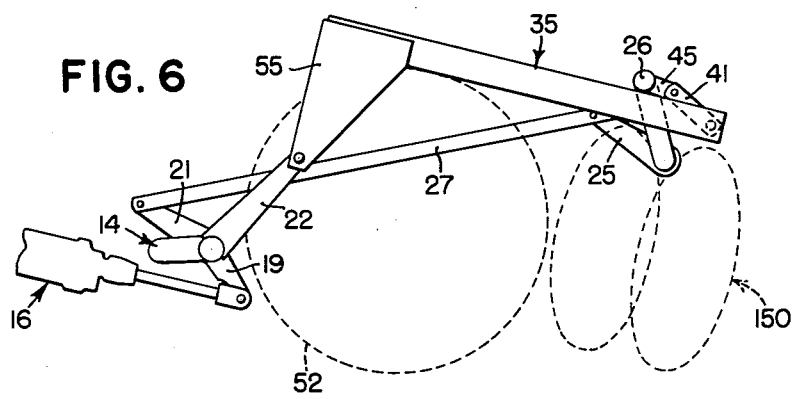

INVENTOR.
TALBERT W. PAUL
BY
ATTORNEYS

June 26, 1956  T. W. PAUL  2,751,739
ADJUSTABLE BEET DIGGING AND LIFTING DEVICE
Filed May 29, 1952  5 Sheets-Sheet 5
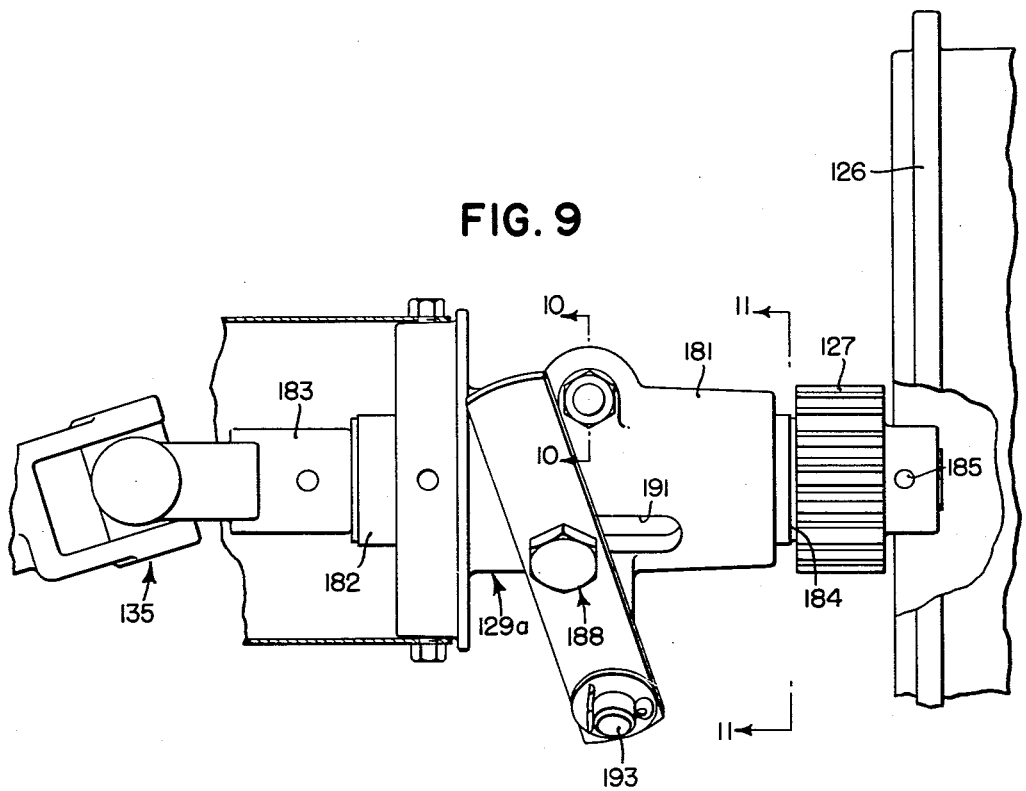
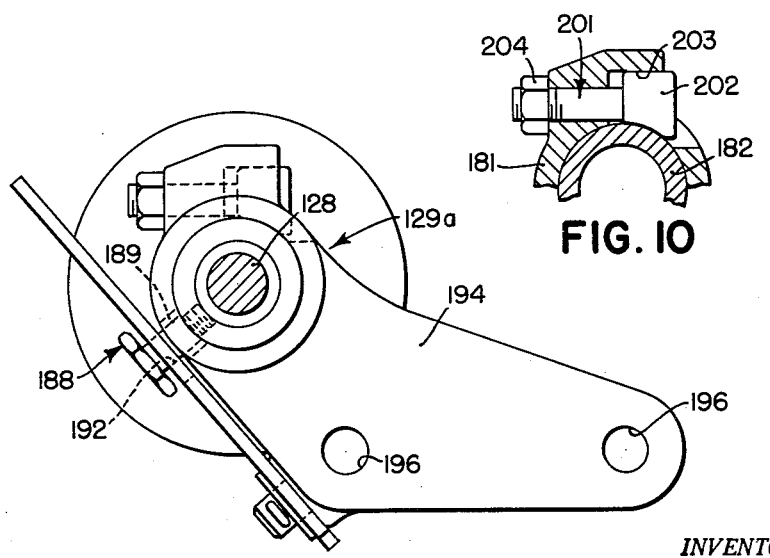
INVENTOR.
TALBERT W. PAUL
ATTORNEYS

United States Patent Office 2,751,739
Patented June 26, 1956

2,751,739

ADJUSTABLE BEET DIGGING AND LIFTING DEVICE

Talbert W. Paul, Moline, Ill., assignor to Deere & Company, Moline, Ill., a corporation of Illinois Application May 29, 1952, Serial No. 290,753

9 Claims. (Cl. 55—108)

The present invention relates generally to agricultural machines and more particularly to beet harvesters and the like.

The object and general nature of the present invention is the provision of a beet harvester having ground-penetrating beet-digging means and, forwardly thereof, beet-top-dispersing means, both carried by a sub-frame, with means for raising and lowering the sub-frame so that the beet-digging means may be raised and lowered so as to operate at different depths, as desired without materially affecting the position of the top-dispersing means, yet when the implement is to be brought into transport position, the connections with the sub-frame are such that the deeper-operating beet-digging means and the top-dispersing means are both raised to substantially the same level above the ground surface.

It is a further feature of this invention to provide, associated with the mechanism just mentioned, beet-topping means and connections therefrom to the raising and lowering means which include lost-motion means whereby during the operating range of adjustments of the beet-digging means, the beet-topping means operates at substantially the same level, but when the beet-digging means and the top-dispersing means are raised into their transport position, the beet-topping means is also raised into its transport position.

These and other objects and advantages of the present invention will be apparent to those skilled in the art after a consideration of the following detailed description, taken in conjunction with the accompanying drawings, in which Figure 1 is a side view of a beet harvester in which the principles of the present invention have been incorporated.

Figure 2 is a plan view of the principal portions of the harvester shown in Figure 1.

Figure 3 is a fragmentary detail view of portions of the finder wheel and topping units.

Figures 4-6 illustrate the action of the raising mechanism for the beet lifting wheels and the top-dispersing wheels, Figure 4 showing a deep operating position, Figure 5 a shovel operation position, and Figure 6 the transport position.

Figure 9 is an enlarged fragmentary view showing clutch mechanism adapted for use with the drive means shown in Figures 7 and 8.

Figure 10 is a fragmentary sectional view, taken along the line 10—10 of Figure 9.

Figure 11 is a sectional view taken along the line 11—11 of Figure 9.

Figure 7:
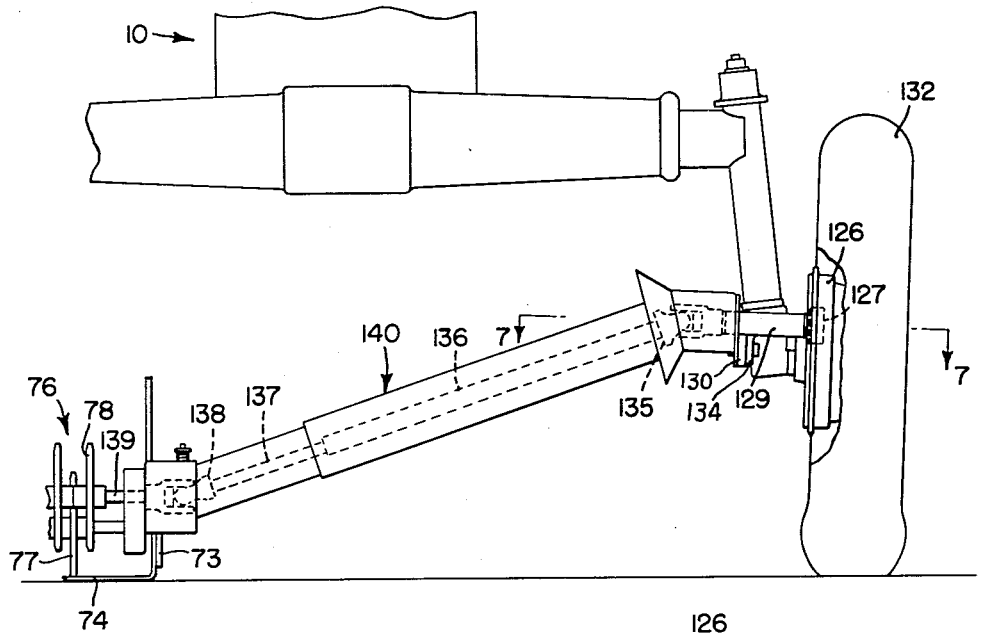
Figure 7 is a front end view of the harvester, certain parts being omitted, showing the drive for the finder wheel unit of the harvester.

The beet harvester of the present invention is adapted to be mounted on a tractor 10 which is of conventional construction so far as the present invention is concerned. The frame of the tractor 10 carries front and rear brackets 11 and 12 in which relatively heavy rock arms 13 and 14 are mounted for rocking movement. Power operated raising and lowering means is carried by the tractor and includes a hydraulic piston and cylinder unit 16 anchored at its rear end to a bracket 17 that is fixed to the rear axle 18 of the tractor. The front end of the ram unit 16 is connected to an arm 19 that is fixed to the rear rock-shaft 14. As best shown in Figure 1, the latter member has fixed thereto an upper arm 21 and a pair of lower arms 22, these arms forming a bell crank with the upper arm 21 extending forwardly and upwardly and the lower arms 22, each longer than the arm 21, extending downwardly and forwardly. The forward rockable member 13 carries an arm 25 fixed thereto and forming with an extension 26 of the member 13, a forward bell crank. The arm 25 is preferably of substantially the same length as the arm 21, and the two arms 21 and 25 are interconnected by a motion-transmitting link 27 that extends in a fore-and-aft direction along one side of the tractor. The link 27 is extended forwardly of the pin 31 that connects the forward end of the link 27 with the upper end of the arm 25 for a purpose which will be explained below. The rear end of the motion-transmitting link 27 is connected by a pin 32 to the upper end of the rear arm 21.

A sub-frame 35 is supported from the tractor through the rockable members 13 and 14, and the sub-frame comprises inner and outer, fore-and-aft extending bars 36 and 37 suitably connected together at their forward ends by a cross plate 38 which carries or is provided with an apertured lug 39. A link 41, comprising a pair of laterally spaced apart link straps, is pivotally connected, as by a pin 43, to the lug 39 and at its upper end is pivotally connected by a pin 44 with an apertured lug 45 fixed to the outturned forward portion of the rockshaft 26.

Intermediate their ends the sub-frame members 36 and 37 are interconnected by a rigid cross brace 48 to which the upper end of a downwardly extending standard 49 is rigidly fixed, as by welding or the like. The standard 49 is braced by bars 51 that extend forwardly and upwardly from the lower portion of the standard to points of connection with the sub-frame 35. A pair of beet-lifting wheels 52 are journaled for rotation on spindles carried at the lower end of the standard 49, the beet-lifting wheels 52 including teeth or spikes 53 which penetrate the ground and lift the beets from the soil during normal operation. The present invention is not concerned particularly with the details of the lifting wheels 52. Secured to the rear end of each of the sub-frame bars 36 and 37 is a pair of depending brackets 55 the lower end of each of which is pivotally connected, as at 56, to the lower forward end of the associated arm 22, whereby up and down swinging of the arms 22 serves to raise and lower the rear end of the subframe 35, which is the end carrying the ground-penetrating beet-digging or -lifting elements 52.

A supporting structure 60 is fixed to the forward portion of the tractor and comprises right- and left-hand, generally fore-and-aft extending bars 61 and 62, the forward ends of which carry a cross member 63 in the form of a pipe or tube, the right end of which extends outwardly and lies in front of the sub-frame 35, as best shown in Figure 2. A pair of downwardly and forwardly extending brackets 65 are fixed to the right-hand portion of the cross pipe 63 and have downward extensions 66 that pivotally receive pairs of upper and lower link members 67 and 68 by which a topping unit 70 is swingably connected with the tractor-supported framework.

The topping unit per se is largely conventional, so far as the present invention is concerned, the topping unit comprising a vertical frame 71 comprising upright bars 72 suitably interconnected by bracing or the like and at their lower ends carrying ground-engaging sled runner sections 73, to one of which a topping knife 74 is fixed. The topping unit 70 also includes a finder wheel unit 76 and this unit comprises two sections 77 and 78 of finder wheels suitably geared to rotate together and carried by suitable bearing means at the lower ends of a pair of finder wheel frame bars 79, the upper ends of which are pivotally connected to swing on a cross shaft 81 which forms a pivotal connection between the forward ends of the lower links 68 and the tractor-carried supporting brackets 65. The movement of the finder wheel frame bars 79 and the finder wheel unit 76 relative to the knife frame 71 is limited by a pair of brace links 84, the upper and rear ends of which carry castings 85 having slots 86 receiving pins 87 that are fixed to the upper ends of the vertical knife frame bars 72.

The topping knife unit 70 and the finder wheel unit 76 are raised and lowered into and out of operating position when the digging wheels 52 are raised and lowered by means of a vertical rod 91 suitably connected at its lower end with the finder frame bars 79 and at its upper end with an arm 92 that is fixed to a cross shaft 93 rockably mounted in a pair of depending brackets 94 that form a part of the supporting structure 65 which is rigidly fixed to the front portion of the tractor. Preferably, the arm 92 carries a swivel 121 that is apertured and loosely receives the upper end of the rod 91, the upper end having a head 95 that limits the downward movement of the rod 91 relative to the arm 92 but permits upward movement of the rod relative to the arm. The lower end of the rod 91 is threaded and receives a pair of lock nuts by which the lower portion of the rod 91 is adjustably connected through a yoke 97 with a crossbar 98 the ends of which are rockably received by a casting member 99 fixed to the lower end of each of the finder wheel frame bars 79, the members 99 also pivotally receiving the lower and forward ends of the limit rods 84.

A colter-supporting frame 100 is fixed to the cross-shaft 93 and includes a pair of side bars 101 the rear ends of which are secured as by welding to the cross shaft 93. The forward portion of the frame 100 carries upper and lower crossbars 102 and 103 to which the shanks of a pair of colter units 104 are connected. The colter frame 100 is raised and lowered by means of an arm 107 that is fixed to one of the colter frame bars 101 and the arm 107 carries a swivel eye 108 through which a rod member 109 extends. A collar 111 is fixed to the rod 109 ahead of the swivel eye 108, and rearwardly of the latter a compression spring 112 encircles the rod 109 and is held in different positions of adjustment by a set screw collar 113. The rear end of the rod 109 is pivotally connected, as at 114, with the forward extended end of the motion-transmitting link 27. A pair of bars 117, each having a laterally inturned end 118, are fixed to the colter frame bars 101 and cooperate with the supporting framework 65 to limit the downward movement of the colter units 104. The colters and colter frame, the finder wheel unit 76 and the knife frame 71 are all raised together by rearward movement of the rod 109. However, the colters 104 may be raised and lowered without affecting the position of the topping unit, due to the lost motion between the swivel 121 at the end of the arm 92 and the head 95 on the lifting rod 91. However, when the arm 92 is swung upwardly and the swivel member 121 engages the head 95, further upward swinging of the arm 92 results in the raising of the knife and finder wheel units.

Figure 8:
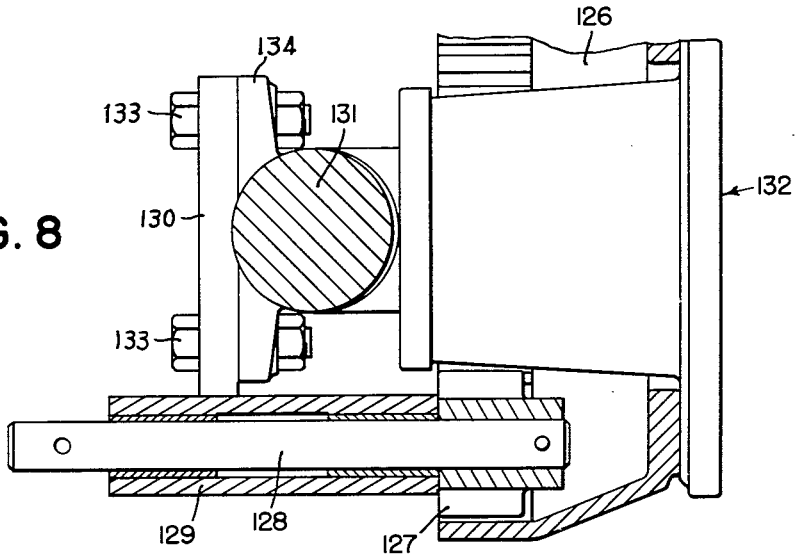
Figure 8 is a detail view, made on an enlarged scale, showing the preferred means for connecting the finder wheel drive mechanism with the left-hand front wheel of the tractor.

The finder wheels 77 and 78 may be driven by any suitable means but preferably, as best shown in Figure 7, they are driven by a simple direct connection from one of the front wheels of the tractor. To this end, the left-hand front wheel of the tractor is provided with a driving gear 126 which meshes with a pinion 127 fixed to a short shaft 128 that is journaled for rotation in a housing 129 fixed to the associated spindle 131 upon which the left-hand front tractor wheel, indicated at 132, is journaled for rotation. Preferably, as shown in Figure 8, a generally fore-and-aft extending bar 130 carrying the housing 129 is fixed by bolts 133 to an apertured pad or lug means 134 that forms a part of the lower portion of the spindle 131, as shown in Figure 7. A universal joint 135 connects the inner end of the shaft 128 with a pair of telescopically associated shaft sections 136 and 137, and a universal unit 138 connects the inner end of the latter section with a shaft 139 that is connected to drive the two sets of finder wheels. Preferably, suitable shield means, indicated generally at 140, is provided to protect the rotating shaft sections and associated universals and other parts from contact with weeds, tops and other material which might otherwise wrap around the shaft means and/or its universal joints.

Top-dispersing means, indicated generally at 150, is carried by the forward portion of the sub-frame 35, and is disposed generally immediately to the rear of the knife unit 70 and forwardly of the beet-lifting wheels 52, for the purpose of removing tops and the like, severed by the knife 74, from the path of movement of the lifting spike wheels 52. Such top-dispersing means will now be described. The top-dispersing means includes a pair of rotatable members 151 and 152, each having a plurality of radially outwardly, resiliently mounted top-engaging spring fingers 153. Each of the rotatable members 151 and 152 includes a shaft on which a sprocket is fixed. A sprocket chain 156 is trained over the sprockets just mentioned and over a pinion fixed to a shaft that extends from a gear case 157 carried at the front end of the sub-frame 35. Power is transmitted from the tractor engine to the laterally innermost top-dispersing wheel shaft by any suitable means, such as a drive shaft 158. The top-dispersing wheels 151 and 152 are raised and lowered when the sub-frame 35 is raised and lowered.

A drive chain 161 connects a pinion 162 on a shaft extending from the gear case 157 with a sprocket gear 164 on a shaft 165 that is carried by the brackets 55. A beet-engaging paddle wheel 166 is fixed to the shaft 165 and operates generally between the upper rear portions of the beet-lifting wheels 52. The paddle wheel 166 directs beets from the wheels 52 onto a conveyor unit 167, and the latter unit delivers the beets onto an elevator unit 168.

The outfit, when aligned with a row of beets to be harvested, is placed in operating condition by permitting the oil to flow from the hydraulic unit 16, whereupon the colters, the topping and finder units, and the sub-frame 35, carrying the digging wheels 52 and top-dispersing wheels 151 and 152, lower by their own weight into an operative position in which the beet-digging wheels 52 penetrate the ground to the desired depth while the colters 104 run just underneath the surface of the ground and the finder and topping units 70 and 76 and the top-dispersing wheels 151 and 152 operate at or slightly above the ground surface. By stopping the retracting movement of the ram 16 at the desired point, the operating positions of the various parts of the harvester may be determined. Figure 4 shows the wheels 52 in a relatively deep position.

If it should be desired, as to suit different soil and/or crop conditions, to operate with the wheels 52 at a somewhat reduced depth of penetration, as indicated in Figure 5, for example, it would still be desirable to have the finder wheels and topping knives, as well as the top-dispersing wheels 151 and 152, remain in operating position at or close to the surface of the ground. According to the principles of the present invention, this is accomplished by having the rear lifting arms 22 relatively long while the effective length of the arm 26 is relatively shorter (Figure 1), whereby when the rocking members or bell cranks 13 and 14 are rocked together, the rear end of the sub-frame 35 is raised and lowered but the front end is raised only a slight amount, remaining substantially at its initial level. This action is augmented by the link 41 and its disposition, extending upwardly and forwardly from the front end of the sub-frame 35, whereby during the first portions of the raising movement of the sub-frame 35, the link 141 swings downwardly at its lower end relative to the front bell 13. However, after the lifting wheels 52 have been raised to points adjacent the surface of the ground, then the front end of the sub-frame 35 is raised at a somewhat increased rate, so that in the transport position the lower portions of the beet-digging wheels 52 and the top-handling or top-dispersing wheels 151 and 152 lie at about the same height above the ground, as indicated in Figure 6. During the initial raising movement of the digging wheels 52, substantially no raising of the knife and finder wheel unit 76 occurs, by virtue of the lost motion between the swivel eye 121 and the upper end 95 of the finder wheel lifting rod 91.

The form of drive means as shown in Figures 7 and 8 provides for driving the finder wheel unit 76 by a direct connection with the left-hand front tractor wheel. However, where fields are far apart, or for other reasons, it may be desirable to provide means for interrupting the drive between the front wheel of the tractor and the finder wheel unit whenever the outfit is to be transported any appreciable distance. Accordingly, referring to Figures 9–11, the present invention contemplates a simple hand-operated, drive-interrupting mechanism which will now be described.

In this form of the invention the stub shaft housing 129a is provided with a generally cylindrical section 181 in which a sleeve 182 surrounds the stub shaft 128 and rotatably receives the latter. The sleeve 182 is held against axial displacement relative to the shaft 128 by one of the yokes 183 making up the universal joint 135 (Figures 7 and 9), and a thrust collar 184 lying against the pinion 127, which may be fixed to the outer end of the shaft 128 by any suitable means, such as a pin 185. The sleeve 182 does not rotate in the housing 181. Instead, the inner end of a stud bolt 188 is threaded into a tapped opening into the sleeve 182 and, when tightened, bears against the shaft 128. The outer portion 189 of the stud bolt 188 is generally cylindrical and is disposed for axial movement in a slot 191 formed in the casing 181. The cylindrical portion 189 of the stud bolt 188 receives and passes through an opening 192 formed in a hand lever 193, the lower end of which is pivotally connected to a projection 193 carried on an extension 194 of the housing 181, the extension 194 being apertured, as at 196, to receive suitable attaching means by which the housing 181 and associated parts are connected to the lower end of the spindle 131. Since the stud bolt 189 is fixed to the sleeve 182 and is slidable in the slot 191, swinging the hand lever 193, as from its left-hand position, Figure 9, into a right-hand position, serves to shift both the sleeve 182 and the shaft 128 to the right (Figure 9) carrying with it the pinion 127 and causing the latter to engage the gear 126 on the left-hand front tractor wheel, thereby establishing a drive between the left-hand tractor wheel and the finder wheel unit 76.

In order to insure that the pinion 127 will be maintained in driving relation at all times that it is desired to drive the finder wheel unit 76, I provide a clamping bolt 201 having a wedge-shaped head 202 disposed within a recess 203 of the housing 181. As best shown in Figure 10, the threaded end of the bolt 201 carries a nut 204, and when the latter is tightened the wedge or clamping head 202 is caused to tightly engage the sleeve 182, thus holding the latter against any axially directed displacement. By loosening the nut 204, the shaft 128 is freed for movement, and may be moved, as desired, by swinging the hand lever 193.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a beet harvester including a mobile frame and raising and lowering means thereon, the improvement comprising a sub-frame extending in generally fore-and-aft relation, beet lifting means carried at the rear end of said sub-frame, top engaging means carried at the front end of said sub-frame, a pair of fore-and-aft spaced swingable arms for connecting the end portions of said sub-frame with said mobile frame for raising and lowering the sub-frame, the rear swingable arm being longer than the front arm, link means interconnecting said arms to cause them to swing together, a link connecting the front end of said sub-frame with the shorter arm, said link extending from said sub-frame upwardly and forwardly toward said shorter arm, whereby as said sub-frame is raised by the upward swinging of said arms, the forward end is raised at a substantially lower rate than the rear end, and means for connecting said swingable arms with said raising and lowering means.

2. In a beet harvester, a mobile frame, a beet-engaging finder and beet top removing unit floatingly connected with said frame, a sub-frame disposed rearwardly of said floating unit, a beet digging unit carried at the rear end of said sub-frame, a top handling unit carried at the forward end of said sub-frame adacent said top removing means to shift tops removed from the beets by said top removing unit, a beet digging unit carried at the rear end of said sub-frame, common raising and lowering means for raising and lowering all of said units together, lost-motion means connecting said first unit with said raising and lowering means, and means connecting said sub-frame with said raising and lowering means, said connecting means including means for raising the front end of the sub-frame at a slower rate than the rear end, whereby said raising and lowering means may move through a first range for raising and lowering said beet digging unit without materially changing the position of said top removing and top handling units.

3. In a beet harvester including a mobile frame and raising and lowering means thereon, the improvement comprising a sub-frame extending in a generally fore-and-aft direction, a pair of bell cranks adapted to be mounted in fore-and-aft spaced relation on said mobile frame, a motion-transmitting link connected at its ends, respectively, with one arm of each of said bell cranks, said arms being of substantially equal length and the length of said link being such that said arms are disposed in parallelism, whereby said bell cranks are constrained to swing together at substantially the same angular rate of rotation, the other arms of said bell cranks being of unequal length whereby one swings through a longer arc than the other, means connecting said last mentioned one bell crank arm with one end of said sub-frame and the other bell crank arm with the other end, whereby said one end of said sub-frame is raised and lowered through a greater distance than the other end, ground-entering beet lifting means carried adjacent said one end of the sub-frame, top engaging means carried adjacent the other end of said sub-frame, and means for connecting said raising and lowering means on the mobile frame with at least one of said bell cranks for raising and lowering said sub-frame.

4. In an agricultural implement including a mobile frame, the improvement comprising a fore-and-aft extending sub-frame, ground-penetrating operating means carried adjacent one end of said sub-frame, a second operating means adapted to operate substantially at or above the surface of the ground and carried adjacent the other end of said sub-frame, a pair of fore-and-aft spaced apart lifting members adapted to be swingably connected with said mobile frame, motion-transmitting means interconnecting said spaced apart lifting members for causing them to swing together, and means connecting said lifting members with the end portions, respectively, of said sub-frame, said connecting means including arms of different lengths whereby the end of the sub-frame carrying said ground penetrating means is raised and lowered through a greater extent than the other end of said sub-frame.

5. In an agricultural implement including a mobile frame, the improvement comprising a fore-and-aft extending sub-frame, ground-penetrating operating means carried adjacent one end of said sub-frame, a second operating means adapted to operate substantially at or above the surface of the ground and carried adjacent the other end of said sub-frame, a pair of fore-and-aft spaced apart lifting members adapted to be swingably connected with said mobile frame, motion-transmitting means interconnecting said spaced apart lifting members for causing them to swing together, each of said lifting members having an arm and said arms being connected with the end portions, respectively, of said sub-frame, the arm that is connected with the sub-frame end adjacent said ground-penetrating operating means being longer than the other arm, whereby the end of the sub-frame carrying said ground-penetrating means is raised and lowered through a greater extent than the other end of said sub-frame.

6. The invention set forth in claim 5, further characterized by means including a link extending at an angle to the horizontal and connected at one end with the other of said lifting arms and at its other end with the other end of said sub-frame.

7. In a beet harvester including a mobile frame and raising and lowering means thereon, the improvement comprising a sub-frame extending in a generally fore-and-aft direction, ground-penetrating beet lifting means carried by said sub-frame adjacent the rear end thereof, beet top engaging means carried by said sub-frame adjacent the forward end thereof, a pair of fore-and-aft spaced apart lifting members adapted to be swingably connected with said mobile frame, motion-transmitting means interconnecting said spaced apart lifting members for causing them to swing together, each of said lifting members having an arm and said arms being connected with the end portions, respectively, of said sub-frame, the arm that is connected with the sub-frame end adjacent said ground-penetrating beet lifting means being longer than the other arm, and means including a link extending at an angle to the horizontal and connected at one end with the other of said lifting arms and at its other end with the other end of said sub-frame adjacent said top engaging means, whereby the end of the sub-frame carrying said ground penetrating, beet lifting means is raised and lowered through a greater extent than the other end of said sub-frame carrying said beet top engaging means.

8. In a beet harvester including a mobile frame and raising and lowering means thereon, the improvement comprising a sub-frame extending in generally fore-and-aft relation, beet lifting means carried at the rear end of said sub-frame, top engaging means carried at the front end of said sub-frame, a pair of fore-and-aft spaced swingable arms for connecting the end portions of said sub-frame with said mobile frame for raising and lowering the sub-frame, the rear swingable arm being longer than the front arm, link means interconnecting said arms to cause them to swing together, a link connecting the front end of said sub-frame with the shorter arm, the distance from the point of connection of the rear arm with the sub-frame to the point of connection of said link with the sub-frame being less than the distance between the ends of said arms when said sub-frame is in its lowered position, whereby, when the arms are swung to raise said sub-frame from its lowermost position, said link at first swings downwardly and forwardly, which reduces the rate at which the front end of the sub-frame is raised relative to the rear end, after which said link swings upwardly and forwardly, thereby increasing the rate at which the front end of the sub-frame is raised, and means for connecting said swingable arms with said raising and lowering means.

9. In a beet harvester including a mobile frame and raising and lowering means thereon, the improvement comprising a sub-frame extending in generally fore-and-aft relation, beet lifting means carried at the rear and of said sub-frame, top engaging means carried at the front end of said sub-frame, a pair of fore-and-aft spaced swingable arms for connecting the end portions of said sub-frame with said mobile frame for raising and lowering the sub-frame, the rear swingable arm being longer than the front arm, link means interconnecting said arms to cause them to swing together, a link connecting the front end of said sub-frame with the shorter arm, the distance from the point of connection of the rear arm with the sub-frame to the point of connection of said link with the sub-frame being less than the distance between the ends of said arms when said sub-frame is in its lowered position, whereby, when the arms are swung to raise said sub-frame from its lowermost position, said link at first swings downwardly and forwardly, which reduces the rate at which the front end of the sub-frame is raised relative to the rear end, after which said link swings upwardly and forwardly, thereby increasing the rate at which the front end of the sub-frame is raised, means for connecting said swingable arms with said raising and lowering means, a beet-engaging finder and beet top removing unit floatingly connected with said mobile frame, and means connected with said link means and having a lost-motion connection with said unit for raising the latter at about the time said link starts to swing upwardly and forwardly.

References Cited in the file of this patent

UNITED STATES PATENTS

| | | |
|---|---|---|
| 2,139,802 | Catchpole | Dec. 13, 1938 |
| 2,405,205 | Gordon et al. | Aug. 6, 1946 |
| 2,433,799 | Walz et al. | Dec. 30, 1947 |
| 2,470,211 | Bozeman, Sr., et al. | May 17, 1949 |
| 2,509,757 | Botimer | May 30, 1950 |
| 2,535,960 | Schmidt | Dec. 26, 1950 |
| 2,631,513 | Silver et al. | Mar. 17, 1953 |
| 2,651,155 | Orendorff | Sept. 8, 1953 |
| 2,655,853 | Lee | Oct. 20, 1953 |